Figure 1:
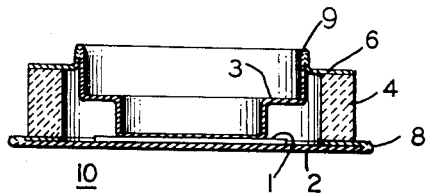

July 24, 1956  P. J. COLLERAN ET AL  2,756,374
RECTIFIER CELL MOUNTING
Filed Dec. 27, 1954

Inventors:
Paul J. Colleran
Albert C. English
Francis P. Mulski
by, Richard E. Hosley
Their Attorney

United States Patent Office 2,756,374
Patented July 24, 1956

2,756,374
RECTIFIER CELL MOUNTING

Paul J. Colleran, Beverly, Albert C. English, Lynn, and Francis P. Mulski, Salem, Mass., assignors to General Electric Company, a corporation of New York Application December 27, 1954, Serial No. 477,822

7 Claims. (Cl. 317—234)

Our invention relates to mountings for metallic rectifier cells and particularly to that type of mounting in which the rectifier cell is enclosed in order to protect it from deleterious agents found in the atmosphere or in surrounding media.

Metallic rectifiers having thin barrier layers and operating at relatively high voltage are adversely affected by the presence of moisture and certain other materials to which they may be subjected in storage or in use. The ever present moisture in the atmosphere is a controlling factor although the presence of other surrounding media such as dust, corrosive fumes, fungus, and organic materials such as may be used as cooling fluids or solvents for potting compounds for the cell may assume equal importance in their effect on the cell.

When rectifier cells are used or stored in the presence of high humidities, they may be protected by certain moisture resisting paints and varnishes which are satisfactory for certain applications. For other applications the cells must be protected by immersing them in a suitable liquid, by encapsulating or enclosing them in a suitable compound, or by providing them with hermetically sealed enclosures.

The cell mounting should also provide for the dissipation of the heat losses in the cell. A cell having a high current capacity for its physical size will have such a small thermal mass that its heat loss must be dissipated as fast as it is generated or the cell will overheat and be destroyed. Consequently the cell mounting must have a suitable structure for conducting this heat loss to suitable storage or dissipating members associated with the cell. Furthermore the cell mounting must have a structure which will permit fabrication thereof without applying destructive temperatures to the cell.

The problems above considered are especially acute in monocrystal semiconductors of the P–N junction type as exemplified by germanium and silicon cells. Thus a germanium cell about $9/16$ inch in diameter and about 20 mils thick will provide half wave rectification at 65 volts and 75 amperes with a heat loss of about 60 watts. This heat loss must be dissipated as fast as it is generated or the cell will overheat and be destroyed. The cell may also be destroyed if heated above a critical temperature during the fabrication of its mounting. Furthermore the very thin barrier layer in such a cell operating at high voltage is adversely affected by high humidities and by the presence of other deleterious agents to which it may be subjected. Unless surface contamination of the cell at the P–N junction barrier region is prevented, the cell may fail electrically and be destroyed.

It is an object of our invention to provide a cell mounting which completely encloses the cell and has a physical structure suitable for accommodating terminal connections which in addition to serving as current conductors also provide means for dissipating the heat generated in the cell by current flow therethrough.

It is also an object of our invention to provide a mounting in which the cell may be hermetically sealed.

It is another object of our invention to provide a cell mounting formed of component parts which may be separately fabricated at temperatures which would be destructive to the cell and thereafter assembled under conditions which due to the resulting structure produced will prevent injury to the cell as a result of heating operations employed in making the assembly.

Further objects of our invention will become apparent from the following description of the embodiment thereof shown in the drawing.

Figure 2:
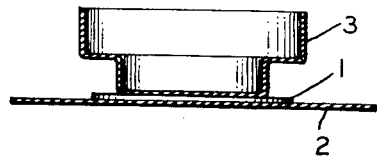
Figure 3:
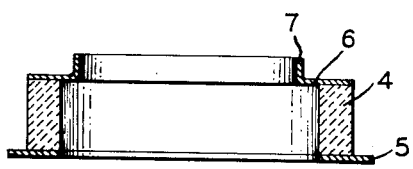
Figure 4:
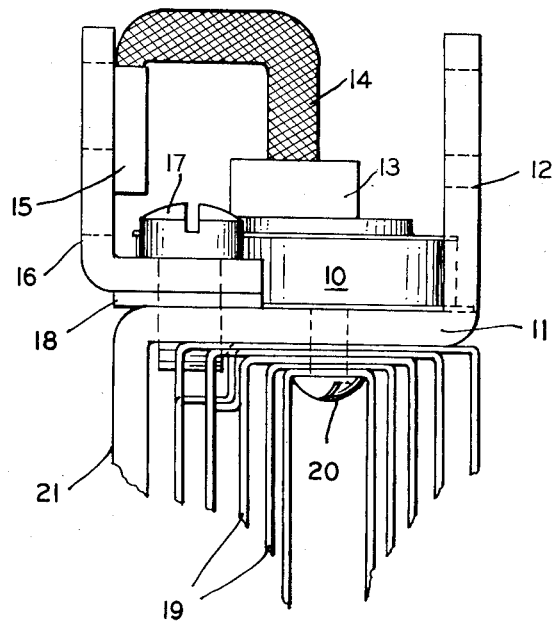

In the drawing, Fig. 1 is a cross sectional view showing the structure of a rectifier cell mounting embodying our invention; Figs. 2 and 3 are like cross sectional views showing the rectifier cell subassembly and the cell enclosure subassembly which are united with one another to form the mounting shown in Fig. 1, and Fig. 4 is a side view showing the cell mounting in a terminal block which provides connections for the cell in the mounting as well as means for conducting heat therefrom in order to maintain its operating temperature at a safe value.

In accordance with the embodiment of our invention shown in the accompanying drawing, the rectifier cell mounting comprises a rectifier cell sandwiched between a metallic plate and the closed end of a metallic cup. One contact surface of the cell is in conductive engagement with a central area of the metallic plate which is large enough to provide a border area surrounding this central area and extending laterally of the cell.

The closed end area of the metallic cup has a surface area which is the same or smaller than the other contact surface of the cell so that the edge area of the cell is exposed. This assembly is enclosed by a hollow body of electrically insulating material having at one end thereof an outwardly extending rim portion which is joined to the border area of the metallic plate engaging one contact surface of the cell and has at its other end an inwardly extending portion with a central opening therein formed by an axial outwardly extending flange of the same predetermined configuration as the open end side wall structure of the cup with which it makes an overlapping telescopic engagement and to which it is joined. This enclosure may be formed of a hollow impervious ceramic cylinder the opposite ends of which have been metalized and bonded to metallic rings respectively extending inwardly and outwardly from the walls of the cylinder to provide the rim portion and the inwardly extending portion of the hollow body above referred to. When the metallic plate and metallic cup referred to above are of circular contour, the plate becomes a disk and the open end of the cup becomes a cylinder each having outer edges which respectively match and are coextensive with the outer and inner edges of the rings attached to opposite ends of the ceramic cylinder. These edges may be joined by a fusion welding operation which can be made without damaging the cell due to heat flow through the parts to the cell. The resulting structure provides a hermetically sealed enclosure for the cell as well as terminal connections through the disk and closed end of the cup for conductors having terminals of a cross sectional area respectively substantially equal to and greater than the areas of the contact surfaces of the cell sandwiched therebetween. The construction and advantages of our enclosed mounting for a rectifier cell will become apparent from the following detailed description of the embodiment shown in the drawing.

In the drawing Fig. 1 is a sectional view of a rectifier cell mounting embodying our invention and Figs. 2 and 3 are respectively a sectional view of the rectifier cell subassembly and a sectional view of the cell enclosure subassembly which are joined to one another to form our cell mounting. The rectifier cell subassembly comprises a unilaterally conductive cell 1 which is sandwiched between a metallic disk 2 and a metallic cup 3 having cylindrical side walls. One contact surface of the cell is in electrically conductive engagement with a central area of disk 2 which consequently has a border area surrounding this central area and extending laterally of the cell. The outer closed end of cup 3 is in electrically conductive engagement with the other contact surface of the cell. The side wall structure of the cup has been stepped so that its outer end may be of a predetermined standard size while its inner end is of a size which will leave the edge of cell 1 exposed. The disk and cup constitute electrodes for cell 1 and may be attached thereto in any suitable manner depending on the nature of the cell.

In the arrangement illustrated, the cell has been formed of a wafer of germanium which is about 9/16 inch in diameter and about 20 mils in thickness. The closed end of the cup has been attached to one contact surface thereof by an indium solder and its other contact surface has been joined to the central area of disk 2 by means of an arsenic-tin solder. Any suitable metal may be used for the disk and cup shaped electrodes but in the embodiment under consideration these have been made of an alloy of 58% iron and 42% nickel and have a thickness of about 12 mils. The alloying operation is performed in a furnace in the presence of a hydrogen atmosphere at a temperature of the order of 450° to 650° C. We preferably employ a germanium cell wafer having N characteristics. During the alloying operation the indium dissolves some of the germanium and upon cooling a P–N junction is formed in the wafer adjacent the surface layer of indium which acts as a solder to bond the closed end of cup 3 to one contact surface of the germanium wafer. As previously pointed out the side wall of cup 3 is stepped so that the area of its closed end is less than that of the contact surface of the cell which it engages. This leaves the edge of the cell exposed and this makes it possible to clean the edges of the cell after soldering to eliminate surface contamination and short circuiting of the P–N junction barrier region of the cell. A chemical or electrochemical etch may be employed for this operation. For example electrolytic etching in a sodium or potassium hydroxide solution or an immersion in concentrated nitric acid may be used. Disk 2 is soldered to the germanium wafer by an arsenic-tin solder which has been selected so as not to impart P characteristics to this contact surface of the germanium wafer.

The cell enclosure subassembly shown in Fig. 3 comprises a hollow cylinder of ceramic material 4 having opposite ends thereof metallized with silver and bonded to metallic rings 5 and 6 respectively extending outwardly and inwardly from the walls of the cylinder. The outwardly extending ring 5 has an outer diameter equal to the diameter of disk 2 of the cell subassembly so that when these two subassemblies are placed with one another these outer edges will be coextensive with one another. The inwardly extending ring 6 has about the opening therein an axially extending cylindrical flange 7 having an inside diameter equal to the outside diameter of the side wall of cup 3 at its open end. The thickness of the ceramic member 4 and of the rings 5 and 6 together with the extension of rim 7 of ring 6 is such that when ring 5 is placed on disk 2 the outer edge of rim 7 and the outer edge of the wall structure of cup 3 are coextensive with one another.

The hollow ceramic cylinder 4 may be formed of fused alumina which is impervious to gases and liquids and the rings 5 and 6 may have a thickness of about 15 mils and be formed of an alloy containing 54% iron, 29% nickel and 17% cobalt. The assembly of these parts into an integral unit is obtained by brazing in an oven at about 900° C. using silver as the bonding metal between rings 5 and 6 and the silver coated end surfaces of cylinder 4.

The subassemblies shown in Figs. 2 and 3 are assembled as shown in Fig. 1 and the coextensive outer edges of ring 5 and flange 7 of the subassembly of Fig. 3 are joined to the outer edges of disk 2 and cup 3 of the subassembly of Fig. 2. The joints between these edges may be made in any suitable manner but we prefer to secure a sealed union at these joints by means of fusion welds 8 and 9. These welds are preferably made by the so called inert arc welding process in which an arc is established between the seam parts and a tungsten electrode while shielding the arc and molten portions of the weld metal with an inert atmosphere such as argon, helium, or a mixture of these gases. We prefer to use argon as a shielding gas in order to obtain a low current arc the energy of which is sufficient to produce by localized heating the beads of weld metal 8 and 9 without having a heat carry over through the parts to cell 1 which is sufficient to destroy it. Once a germanium cell has been formed as above described, it can not be heated to or above 156° C. without risk of destroying the cell by reason of melting the indium solder used therein.

By using the inert arc welding process it is not necessary to use a flux at the joint being welded and consequently there is no possibility of contaminating the interior of the cell mounting as might result if a flux were used. Furthermore some of the inert argon gas is introduced into the enclosed interior of the cell mounting and consequently reduces the oxygen content of the mixture in contact with the cell. Furthermore during inert arc welding there is no formation of water vapor and any small amount of water vapor in the air mixture sealed within the cell mounting is insufficient to cause any damage to the cell.

The completed cell mounting 10 shown in Fig. 1 may be used in various ways one of which has been illustrated in Fig. 4. As there shown, disk 2 thereof is soldered to the body portion 11 of a terminal lug 12 and the innner surface of the closed end of cup 3 is soldered to the end of a cylindrical terminal 13 formed at one end of a flexible braided conductor 14 having at its other end a terminal 15 which is soldered to a terminal lug 16. These terminal lugs 12 and 16 are part of a terminal block formed by mounting the flanged edge of terminal lug 16 on the body portion 11 of terminal lug 12 by means of bolts 17. Strips of insulating material 18 are interposed between the overlapping portions of the terminal lugs which are held in parallel spaced relationship with one another to form a mechanical shield for the rectifier cell mounting 10. The body portion 11 of terminal lug 12 is provided, on its side opposite from the side on which cell 10 is mounted, with a plurality of heat radiating fins 19 which are held in place relative to one another and the body portion of terminal lug 12 by means of screws 20. The body portion 11 of terminal lug 12 on the side opposite from this lug is provided with a stiff portion 21 which extends in the same direction as the fins 19 and serves as a guard and buffer for these fins which may be made of relatively thin sheet metal. It will be noted that terminal lug 16 is offset from extension 21 of base 11 of terminal lug 12. Consequently lug 12 of another terminal block may be bolted to lug 16 without short circuiting the lugs of any one block.

The attachment of the cup and disk of our cell mounting to the body portion 11 of terminal lug 12 and to the end portion of terminal 13 may be made by soldering. We prefer to use a solder having a melting point of about 103° C. formed of 53.9% bismuth, 29.6% tin and 24.5% cadmium. The surfaces to be joined are pretinned with this solder and joined in an oven at about 130° C. using an acid flux to facilitate joinder of the parts by reason of the solder on the parts flowing together.

The terminal block assembly above described in which terminal lug 16 is offset outwardly from the body portion 11 of terminal lug 12 so that these contact lugs may be connected with similar contact lugs of like terminal blocks without producing a short circuit between the lugs of any one terminal block and in which the terminal lugs form upright side walls disposed in spaced relationship to one another in order to provide a mechanical shield for the rectifier cell mounting, form no part of our invention since this terminal block assembly has been described and claimed in the application of Edgar A. Harty, Serial No. 343,588, filed March 20, 1953 and assigned to the same assignee as the present invention.

From the above description of our cell mounting it is to be noted that we have provided an arrangement in which component parts may be separately fabricated at temperatures which would be destructive to the rectifier cell and thereafter assembled under conditions which, by reason of the structure of these parts, may be joined by welding without transmitting sufficient heat to the cell to cause its destruction. Furthermore the arrangement provides for hermetically sealing the cell and thus excluding therefrom all deleterious agents in the atmosphere or in any media to which it may be exposed.

Our invention is not limited to mounting monocrystal semiconductor cells as above described but may be used for mounting other types of rectifier cells such as copper oxide or selenium cells. Furthermore for certain applications the assembly of parts need not be secured in the specific manner above disclosed. Thus instead of making the closure joints by arc welding other fusion welding methods may be used provided the heating is so localized as not to damage the cell. Furthermore resistance welding procedures may be used; projection welding being used to attach disk 2 to ring 5 and a suitable line welding procedure being used to join the open end of cup 3 to flange 7 of ring 6. To facilitate this latter operation the overlap of members 3 and 6 may be made greater than that shown in the drawing. Also instead of welding the subassemblies to one another, the union of these parts may be secured in other ways as by using solders or plastic cements. Furthermore the material from which the parts of the subassembly are made need not be the specific alloys above described. Under certain circumstances the metallic parts of the cell mounting may be formed of any suitable metal or alloy, copper and its alloys being particularly useful in this respect by reason of their electrical and heat conducting characteristics. It is also obvious that any other suitable insulating material may be used for the hollow ceramic cylinder above described. In fact under certain circumstances the outwardly and inwardly extending portions thereof, described above as being formed of metal and bonded to the ends of the hollow cylindrical insulating member, may be made integral with this hollow insulating member and of the same material of which it is formed.

Thus while we have described a preferred embodiment of our invention in order to illustrate characteristic features thereof, the above and other modifications will occur to those skilled in the art. It is, consequently, our intention to cover in the appended claims all such modifications which fall within the true spirit and scope of our invention.

What we claim as new and desire to secure by Letters Patent of the United States is:

1. A rectifier cell mounting comprising a unilaterally conductive cell having oppositely disposed contact surfaces, a metallic plate having a central area in electrically conductive engagement with one contact surface of said cell and a border area surrounding said central area and extending laterally of said cell, a metallic cup having its outer closed end in electrically conductive engagement with the other contact surface of said cell and having at its open end a side wall structure of predetermined configuration, and an enclosure for said cell formed by a hollow body of electrically insulating material having at one end thereof an outwardly extending rim portion which is joined to the border area of the said metallic plate and having at the other end thereof an inwardly extending portion with a central opening therein formed by an outwardly extending flange of the same predetermined configuration as the open end side wall structure of said cup with which it makes an overlapping telescoping engagement and to which it is joined.

2. A rectifier cell mounting comprising a unilaterally conductive cell having oppositely disposed contact surfaces, a metallic plate having a central area in electrically conductive engagement with one contact surface of said cell and a border area surrounding said central area and extending laterally of said cell, a metallic cup having its outer closed end in electrically conductive engagement with the other contact surface of said cell and having at its open end a side wall structure of predetermined configuration, an enclosure for said cell formed by a hollow body of electrically insulating impervious material having a metal rim plate and a metal closure plate respectively attached and sealed to the opposite ends thereof, said rim plate extending outwardly therefrom and overlapping the border area of the said metallic plate and said closure plate extending inwardly therefrom and having a central opening therein formed by an outwardly extending flange of the same predetermined configuration as the open end side wall structure of said cup with which it makes an overlapping telescopic engagement, a sealed joint between the overlapping portions of said rim plate and said metallic plate, and a sealed joint between the overlapping portions of said closure plate and said metallic cup.

3. A rectifier cell mounting comprising a unilaterally conductive cell having oppositely disposed contact surfaces a metallic plate having a central area in electrically conductive engagement with one contact surface of said cell and a border area surrounding said central area and extending laterally of said cell, a metallic cup having its outer closed end in electrically conductive engagement with the other contact surface of said cell and having at its open end a side wall structure of predetermined configuration, an enclosure for said cell formed by a hollow body of impervious ceramic material having metallized end surfaces and having a metallic rim plate and a metallic closure plate respectively bonded and sealed to said metallized end surfaces, said rim plate extending outwardly therefrom and overlapping the border area of the said metallic plate and said closure plate extending inwardly therefrom and having a central opening therein formed by an outwardly extending flange of the same predetermined configuration as the open end side wall structure of said cup with which it makes an overlapping telescopic engagement, a metallic bond forming a sealed joint between the overlapping portions of said rim plate and said metallic plate, and a metallic bond forming a sealed joint between the overlapping portions of said closure plate and said metallic cup.

4. A rectifier cell mounting comprising a unilaterally conductive cell having oppositely disposed contact surfaces, a metallic plate having a central area in electrically conductive engagement with one contact surface of said cell and a border area surrounding said central area and extending laterally of said cell, a metallic cup having its outer closed end in electrically conductive engagement with the other contact surface of said cell and having at its open end a side wall structure of predetermined configuration, an enclosure for said cell formed by a hollow body of impervious ceramic material having metallized end surfaces and having a metallic rim plate and a metallic closure plate respectively bonded and sealed to said metallic end surfaces, said rim plate extending outwardly therefrom and overlapping the border area of the said metallic plate and said closure plate extending inwardly therefrom and having a central opening therein formed by an outwardly extending flange of the same predetermined configuration as the open end side wall structure of said cup with which it makes a telescopic engagement, a continuous weld between and sealing the overlapping portions of said rim plate and said metallic plate, and a continuous weld between and sealing the overlapping portions of said closure plate and said metallic cup.

5. A rectifier cell mounting comprising a unilaterally conductive cell having oppositely disposed contact surfaces, a metal disk having a central area thereof in conductive engagement with one contact surface of said cell and a rim area laterally spaced from said cell, a metallic cup having its outer closed end in conductive engagement with the other contact surface of said cell and having at its open end a cylindrical side wall structure, a hollow impervious ceramic cylinder having opposite ends thereof bonded to metal rings respectively extending inwardly and outwardly from the walls of said cylinder, the outwardly extending ring overlapping the rim area of said disk and having an outer edge coextensive with the outer edge thereof and the inwardly extending ring having about its opening therein an axially extending cylindrical flange making a telescopic engagement with said cylindrical side wall structure of said cup and having an outer edge coextensive with the outer edge thereof, and fusion welds respectively joining said coextensive edges of said rings with said edge of said cup and said edge of said disk.

6. A rectifier cell mounting comprising a unilaterally conductive cell having oppositely disposed flat contact surfaces, a flat metal disk having a central area thereof in conductive engagement with one contact surface of said cell and a rim area laterally spaced from said cell, a metallic cup having a flat outer closed end in conductive engagement with the other contact surface of said cell and having at its open end a cylindrical side wall structure, a hollow ceramic cylinder having opposite ends thereof bonded to metal rings respectively extending inwardly and outwardly from the walls of said cylinder, the outwardly extending ring being flat and overlapping the rim area of said disk and having an outer edge coextensive with the outer edge thereof and the inwardly extending ring having about its opening therein an axially extending cylindrical flange making a telescopic engagement with said cylindrical side wall structure of said cup and having an outer edge coextensive with the outer edge thereof, and fusion welds respectively joining throughout their lengths said outer edges of said rings and said coextensive edges of said cup and said disk.

7. A rectifier cell mounting comprising a broad area monocrystal semiconductor cell wafer having a P-N junction between oppositely disposed contact surfaces thereof, a metal disk having a central area thereof in conductive engagement with one contact surface of said cell and a rim area laterally spaced from said cell, a metallic cup having its outer closed end of smaller surface area than the other contact surface of said cell with which it is in conductive engagement except at an exposed edge area thereof and having at its open end a cylindrical side wall structure of a predetermined standardized size, a hollow ceramic cylinder having opposite ends thereof metallized and bonded to metal rings respectively extending inwardly and outwardly from the walls of said cylinder, the outwardly extending ring overlapping the rim area of said disk and having an outer edge coextensive with the outer edge thereof and the inwardly extending ring having about its opening therein an axially extending cylindrical flange making a telescopic engagement with said cylindrical side wall structure of said cup and having an outer edge coextensive with the outer edge thereof, a fusion weld joining and sealing said coextensive edges of said outwardly extending ring and said disk, and a fusion weld joining and sealing said coextensive edges of said inwardly extending ring and said cup.

No references cited.